US008671611B2

(12) United States Patent
Ostergren et al.

(10) Patent No.: US 8,671,611 B2
(45) Date of Patent: Mar. 18, 2014

(54) OPTICAL AIMING DEVICE WITH LIGHT SENSOR FOR ADJUSTING RETICLE LIGHT INTENSITY

(75) Inventors: Per-Olof Yngve Ostergren, Odensbacken (SE); Niklas Eriksson, Savedalen (SE); Kennet Jan-Ake Vilhelmsson, Ojersjo (SE)

(73) Assignee: Vidderna Jakt & Utbildning AB, Stora Sundby (SE)

( * ) Notice: Subject to any disclaimer, the term of this patent is extended or adjusted under 35 U.S.C. 154(b) by 0 days.

(21) Appl. No.: 13/523,473

(22) Filed: Jun. 14, 2012

(65) Prior Publication Data
US 2013/0061510 A1 Mar. 14, 2013

Related U.S. Application Data

(63) Continuation of application No. PCT/SE2009/051463, filed on Dec. 18, 2009.

(51) Int. Cl.
*F41G 1/30* (2006.01)
(52) U.S. Cl.
USPC .................. 42/123; 42/131; 33/297; 33/298; 359/428
(58) Field of Classification Search
USPC .............. 42/123, 131, 122, 130; 33/297, 298; 89/41.17; 359/428
See application file for complete search history.

(56) References Cited

U.S. PATENT DOCUMENTS

| 6,373,628 | B1 | 4/2002 | Gunnarsson et al. | |
|---|---|---|---|---|
| 8,196,331 | B2 * | 6/2012 | Chen et al. | 42/123 |
| 2002/0078618 | A1 | 6/2002 | Gaber | |
| 2003/0012015 | A1 | 1/2003 | Schiller et al. | |
| 2007/0245616 | A1 * | 10/2007 | Schiller et al. | 42/123 |
| 2012/0159833 | A1 * | 6/2012 | Hakanson et al. | 42/131 |
| 2013/0152447 | A1 * | 6/2013 | Ostergren et al. | 42/123 |

FOREIGN PATENT DOCUMENTS

WO 0050836 A1 8/2000

OTHER PUBLICATIONS

International Search Report issued in connection with PCT Application No. PCT/SE2009/051463 completed on Aug. 5, 2010 and mailed on Aug. 10, 2010.
International Preliminary Report on Patentability issued n connection with PCT Application No. PCT/SE2009/051463 and mailed on Feb. 28, 2012.

* cited by examiner

*Primary Examiner* — J. Woodrow Eldred
(74) *Attorney, Agent, or Firm* — Gesmer Updegrove LLP

(57) ABSTRACT

An optical aiming device of the type having a light source and a reflective mirror or lens reflecting or projecting an image of a rectile to the eye of a user. The optical aiming device comprises a light sensor arrangement being arranged to cooperate with the light source to enable the adjustment the light intensity of the image of the reticle as a function of the detected light. The light sensor arrangement comprises at least one lens having at least one convex surface and at least one detector wherein the detector is arranged on a distance from the lens so as to detect light from a predetermined area on a predetermined distance from the lens.

11 Claims, 2 Drawing Sheets

OPTICAL AIMING DEVICE WITH LIGHT SENSOR FOR ADJUSTING RETICLE LIGHT INTENSITY

This application is a continuation of PCT Application No. PCT/SE2009/051463 filed on Dec. 18, 2009 and incorporated herein by reference in its entirety.

TECHNICAL FIELD

The present invention relates to an optical aiming device having a light sensor arrangement. The light sensor arrangement comprises at least a lens and a detector which are adapted to sense the light within a predetermined area at a predetermined distance from the light sensor arrangement.

BACKGROUND OF THE INVENTION

Optical aiming devices which have a reticle produced from a light source, such as a light emitting diode (LED) or laser diode, are commonly used for aiming firearms, such as pistols, rifles or shot guns or the like. The reticle is projected onto a semi transparent mirror which reflects the reticle image onto the eye retina of the viewer, i.e. the shooter. Hence the viewer can see both the field of view and the projected image of the reticle simultaneously. The mirror is usually a semi transparent concave mirror which reflects the light from the light source as collimated beams, this enables a parallax free image of the reticle. If only the reticle can be seen, the aiming device is operational. The viewer also perceives the reticle as if the reticle is located at a very remote position from the optical aiming device. The reticle can be dots, rings or other patterns.

One optical aiming device is described in the patent application of US 2002/0078618 A1. The optical sight in the document comprises a light emitting diode which is arranged in working cooperation with a plurality of reticle patterns which can be selectively illuminated. The selective illumination is done by connecting various portions of the reticles patterns to the source of the power supply. By selectively illuminating different reticles, the viewer is said to enable a high accuracy in positioning the reticle elements. No moving parts are used as the illumination of the reticle is done by means of electrically switching between the reticle patterns. The brightness of the image can be adjusted by changing the current supplied to the LED. Further, a feedback line can be connected to adjust the brightness of the LED as a function of the environmental lighting conditions. The document is however silent of how to achieve this.

US 2006/0164704 A1 disclose an optical sight similar to the one described above which uses a laser emitting diode as a light source. The laser diode emits the light onto a semi-transparent mirror which reflects the light in the form of a reticle image onto the retina of the viewer. The brightness of the reticle can be changed by manipulating the duty cycle of the signals that is applied to the laser diode. The proposed solution only regulates the standard illumination of the reticle.

A drawback with the above mentioned optical sights is that they do not really consider that the target can be subjected to a first light condition and that the optical sight itself can be subjected to another light condition. The mentioned solutions in the prior art regulates the reticle illumination as a function of the average ambient illumination surrounding the aiming device. The difference of the light conditions at the optical sight and at the target can however severely influence the viewer's perception of the reticle and thus be a major influence of the prospect of aiming and firing an accurate shoot.

SUMMARY OF THE INVENTION

It is an object of the present invention to at least partly solve the above mentioned drawbacks, or to at least to provide a useful alternative. The object of the present invention is at least partly solved by an optical aiming device according to the present invention. The optical aiming device comprises a base part comprising means for attaching the aiming device to an object, such as a pistol, rifle, shot gun, camera, or the like. The optical aiming device further comprises a mirror or a lens, a light source being arranged to project light on the mirror or lens, wherein the mirror is arranged to reflect at least parts of the light in a first direction. The projected light forms a reticle having a first light intensity. The aiming device further comprises an ambient light sensor arrangement, the ambient light sensor arrangement being arranged to cooperate with the light source to enable adjustment of the light intensity of the reticle to a second light intensity and as a function of a sensed parameter of the light sensor arrangement. The mirror is preferably a partly transparent mirror.

The light sensor arrangement comprises at least one lens having at least one convex surface and at least one detector comprising an effective detector area. Wherein the detector is arranged on a distance from the lens and that the effective detector area of the detector is adapted so as to detect light from a predetermined area on a predetermined distance from the lens. The present invention provides for an aiming device which enables accurately detection of the light conditions at the target scene, instead of detecting the current light conditions at or around the aiming device itself. The light sensor arrangement can swiftly change and adjust for changing light conditions at the actual target, removing, or at least reducing the risk of missing a potential target due to mismatch of the illumination of the reticle and the light conditions at the target. A comfortable reticle is further provided. Thus, the reticle illumination is regulated as a function of the local light conditions in the vicinity of the apparent reticle location.

In an embodiment of the present invention, the detector can be arranged at a distance of about 2-30 mm from the lens. The distance between the detector and the lens can also be adapted so that the predetermined area has a diameter of between 1-5 meters at a distance of 15-25 meters from the lens, preferably 1.5-4 meters at a distance of 18-23 meters from the lens. This enables the light to be measured within a selected space void in front of the light sensor arrangement.

The light sensor arrangement can advantageously be adapted to cooperate with the reticle, or more accurately with the reticle image projected to the retina of the viewer. The reticle can have a first extension in a first dimension, e.g. a diameter, at a specified distance from the mirror or lens. For example, the form of the reticle can be made to correspond to the spread of a hail swarm at a distance of about 20 meters. Generally such spread corresponds to a circle having the diameter of about 0.65 meters at 20 meters when the barrel of the shot gun has a ¼ bore. The reticle can thus be adapted to cover an area of about 20-60% of the predetermined area at a distance of 15-25 meters from the lens. Advantageously the reticle is adapted to cover an area of about 20-60% of the predetermined area at a distance of 20 meters from the lens. The diameter of the area covered by the reticle can likewise be 20-60% of the diameter $D_T$ of the predetermined area. In this way, the perceived extension of the reticle, at a predetermined distance, can be made to correlate to the predetermined area, at the same predetermined distance, from which the light conditions is measured. This provides for a very accurate way of measuring the light conditions at the relevant target area.

The lens comprises at least one convex surface. The lens can be a plano-convex lens or a biconvex lens. The lens should be adapted to direct the incoming light to a focal point which is preferably between the convex surface and the detector. The plano-convex lens or the biconvex lens advantageously comprises one surface having a radius of about 5-10 mm.

The optical aiming device according the present invention can be arranged with an electronic control unit, ECU, e.g. a microprocessor or the like. The light sensor arrangement is further arranged to communicate with the electronic control unit to operate the light intensity of the reticle as a function of a detected parameter. The detected parameter is advantageously the light intensity.

The present invention thus relates to an optical aiming device of the type having a light source and a reflective mirror or lens reflecting or projecting an image of a reticle to the eye of a user. The optical aiming device according to the present invention comprises a light sensor arrangement being arranged to cooperate with the light source to enable the adjustment the light intensity of the image of the reticle as a function of the detected light at the target area. The light sensor arrangement comprises at least one lens having at least one convex surface and at least one detector wherein the detector is arranged on a distance from the lens so as to detect light from a predetermined area on a predetermined distance from the lens. The optical aiming device provides for an aiming device which can adjust the intensity of the projected or reflected image of the reticle to thereby provide for smooth adjustments as the user moves the reticle, i.e. the aim of the aiming device, across the target and/or target scene.

BRIEF DESCRIPTION OF THE DRAWINGS

The present invention will be described in greater detail with reference to the accompanying figures in which.

DETAILED DESCRIPTION OF PREFERRED EMBODIMENTS

Figure 1:
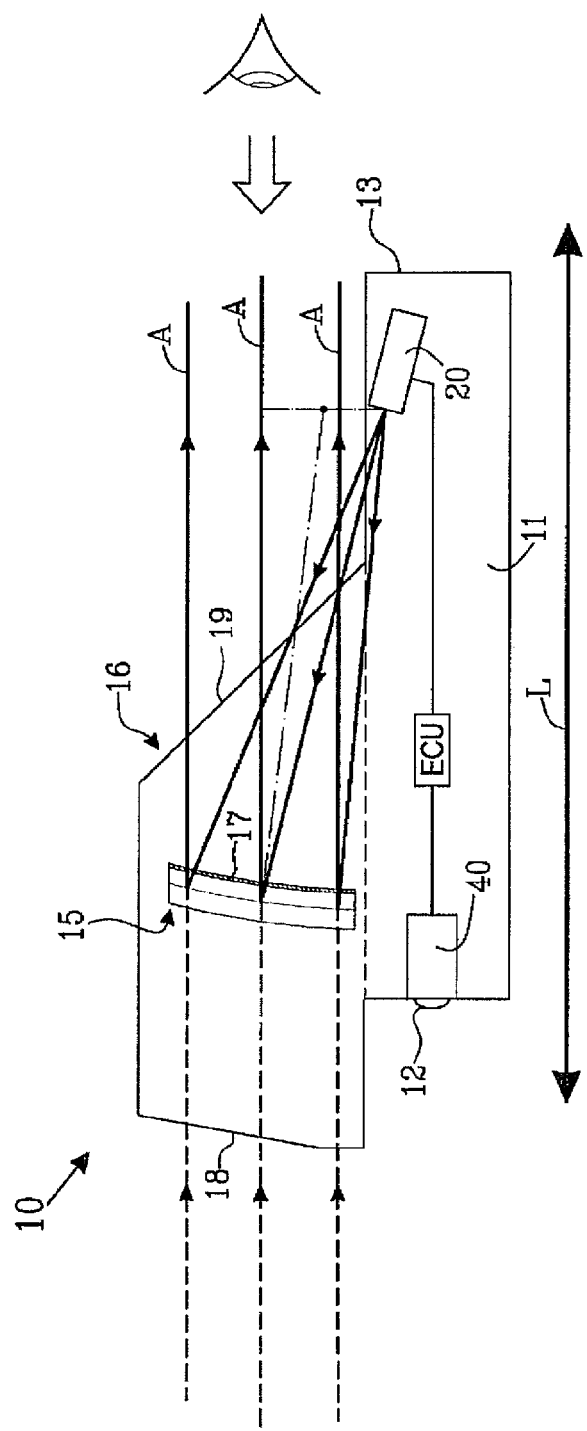
FIG. 1 shows a schematic view from the side and shown partly with a transparent housing of an optical aiming device according to the present invention.

FIG. 1 shows an aiming device 10 having a base part 11. The base part 11 is adapted to be fitted onto a firearm, such as a shot-gun, assault rifle, hunting rifle, pistol or the like by means of a dovetail connection or attachment screw or the like (not shown). The base part 11 exhibits a longitudinal extension L, a distal end 12 and a proximal end 13. The distal end 12 is after assembly with the firearm intended to be closer to the target while the proximal end 13 is intended to be facing towards the eye of the user, i.e. the viewer or shooter, during aiming. The aiming device 10 comprises a partly transparent mirror 15, or semi transparent mirror 15, in the shown embodiment substantially in the form of a pellicle. The partly transparent mirror 15 can however be a mirror or a lens. A lens can be used if the light source is projecting light towards the user. The partly transparent mirror 15 is arranged substantially vertically to the base part 11 and is fixed in a mirror frame 16. The base part 11 and the frame 16 are displayed slightly transparent in FIG. 1 to provide a clearer illustration of the separate arrangements and functions of the aiming device 10.

The partly transparent mirror 15 comprises a slightly concave surface facing the proximal end 13 so as to reflect the light from a light source 20 as indicated by the arrows A. The concave surface is arranged to reflect the light as a collimated beam towards a user and the proximal end 13 of the aiming device 10. The partly transparent mirror can be coated with a light reflecting coating 17. The light reflecting coating 17 preferably reflects light having a wave length of about 650 nm±10 nm, which is generally seen as red light. However, other light intervals may be used; light perceived as yellow, green, blue or orange for example. Optionally, the color of the light can be determined by the choice of light source or combinations thereof.

The mirror frame 16 is a rigid frame in which the partly transparent mirror 15 is fixed. The mirror frame 16 is intended to protect the partly transparent mirror 16 from disruptive forces such as compression forces if the aiming device is accidentally dropped. A first and a second opening 18, 19 permit a user, visualized by the eye in FIG. 1, to see through the frame 16 and of course the partly transparent mirror 15 to view a target.

The light source 20 can be a light emitting diode (LED), a laser or the like, with either an external or internal power source, with respect to the aiming device. A lithium battery (not shown), or any other type of portable power source or battery, can be incorporated into the base part 11 or means for connecting the light source to a power source may be arranged to the aiming device 10 and preferably the base part. A solar cell is one example of another portable power source. The light source 20 is arranged offset to a centre axis of the aiming device 10 and positioned at a distance from the partly transparent mirror 15, the distance being substantially half the distance of the radius of the curvature of the concave surface of the partly transparent mirror 15, so that the light reflected on the partly transparent mirror 15 is reflected as a collimated beam, as indicated by the arrows in FIG. 1. When the light, indicated by the arrows A carries a reticle, i.e. an image such as a circle, the reticle will be virtually projected onto the target and perceived by a user as if the reticle is positioned a distance away form the user. The reticle however is projected onto the retina of the user during aiming. The firearm is aimed by superimposing the reticle onto the desired target.

The aiming device 10 further comprises a light sensor arrangement 40. The light sensor arrangement 40 is arranged at the distal end 12 of the aiming device 10 and detecting light from the area in front of the aiming device only, as will be described below. The light sensor arrangement 40 detects the intensity of the light in the ambient environment in front of the aiming device. However, due to the configuration of the light sensor arrangement 40, light from a predetermined area at a predetermined distance from the light sensor arrangement 40 is collected. The light is due to the present invention can be collected from the actual target area, i.e. a predetermined area, and at least from the area superimposed by the reticle. The predetermined area is specified as a function of the distance from the light sensor arrangement, and more specifically from a lens used in the light sensor arrangement. An electronic control unit ECU, microprocessor or CPU, is arranged in working cooperation with the light sensor arrangement 40 and the light source 20 or optionally with the power source of the light source 40, to adjust the intensity of the reticle as a function of the detected light intensity of a predetermined area whatever the distance is from the light sensor arrangement. The user thus gets an automatic adjustment of the light intensity of the reticle as a function of the light reflecting properties which at least the reticle superimposes.

Figure 2:
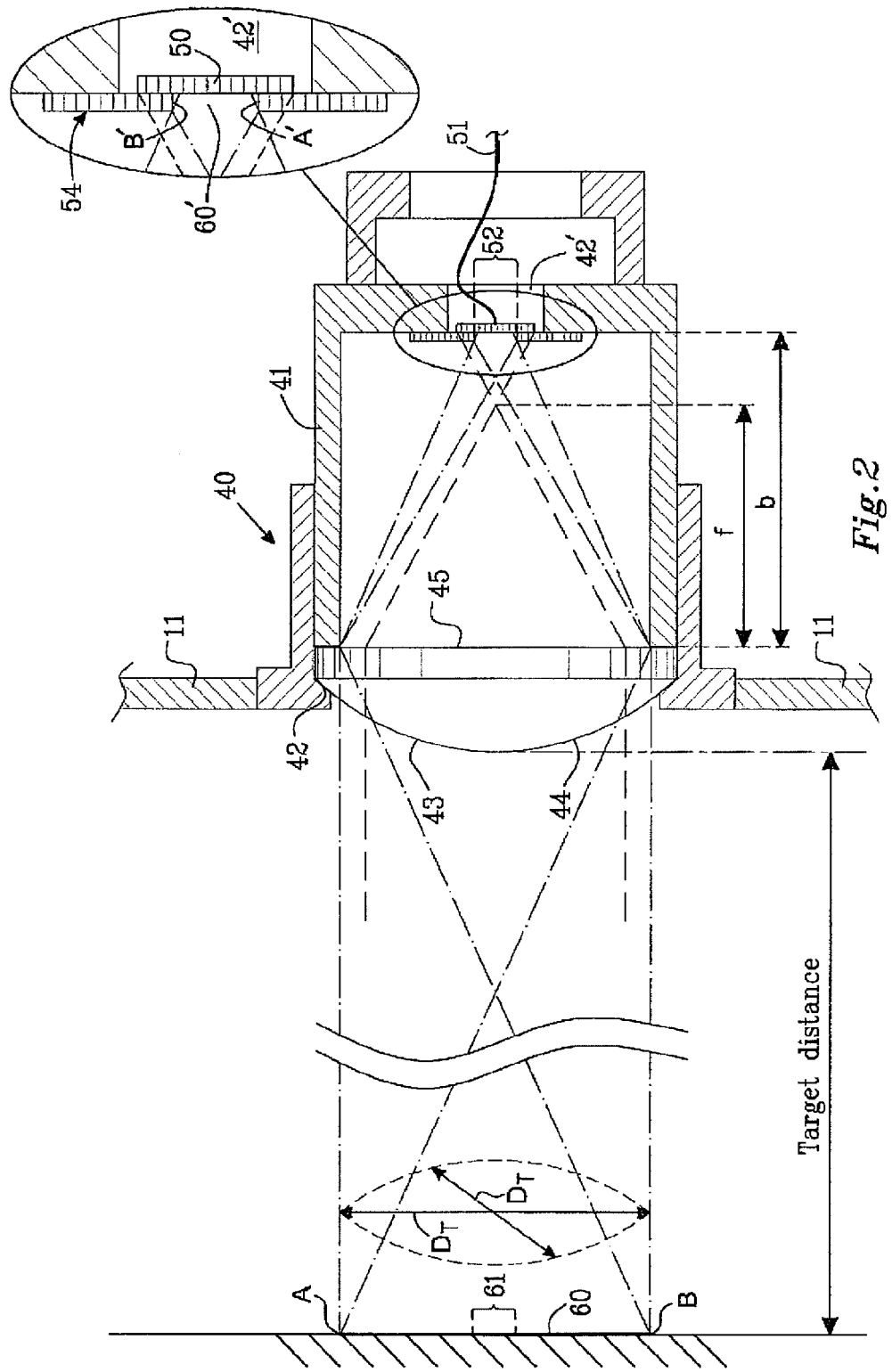
FIG. 2 shows a light sensor arrangement used in the optical aiming device shown in FIG. 1.

FIG. 2 shows with a schematic view a cross section of the light sensor arrangement 40 significantly enlarged, light beams detected by the light sensor arrangement 40, and a light detection area on a target scene background or on a target itself. The target scene background can be parts of a forest, a tree, a bush, a hill, an animal, or the like. As is understood, all these different target scene backgrounds, or the target itself, will exhibit varieties in the light reflected back to the aiming device, thus requiring different light intensity of the reticle to provide the best and most comfortable aiming conditions for the user.

The light sensor arrangement 40 comprises a housing 41, in this case a separate housing from the base part 11, however, a cavity in the base part 11 can advantageously form the housing 41. The interior of the housing is generally adapted to absorb light, i.e. to not reflect any light from the interior surface. Such reflections could cause less accurate readings of the light sensor arrangement. The housing 41 exhibits a substantially cylindrical form with an envelope housing wall and a first opening 42 and a second opening 42' at each end of the housing 41. In this embodiment, the interior surface of the envelope wall comprises a light absorbing material or function. A coating with a light absorbing material, such as a dull color perceived as black, and/or the housing itself can be made of a light absorbing material, or at least with low reflective light properties, for example.

Positioned at the first opening 42 is an optical lens 43 having a convex surface 44 facing towards the target area, i.e. away from the user after the aiming device 10 has been assembled as intended with the firearm. The surface 45 facing towards the second opening 42' of the housing 41 exhibits a substantially straight surface. The lens 43 is thus plano-convex, although a biconvex (also referred to as convex) lens may also be used. The lens 43 and the convex surface 44 comprise a radius of about 5-10 mm.

In the second opening 42' a detector 50 is arranged. The detector 50 is preferably a semiconductor photo diode, but sensors using light dependent resistors or photo transistors can also be used.

Although only one lens is described above together with the detector 50, a plurality of lenses, i.e. a lens system, or at least two lenses are advantageously used in the light sensor arrangement 40 to direct the incoming light to the detection surface of the detector 50. The used detection surface of the detector 50 is referred to as the effective detector area, hence that area of the detector which is actually used to detect the incoming light waves. The detector 50 has an effective detector area 52. The effective detector area 52 is the area of the detector 50 which is active in terms of responding to the incoming light waves. The effective detector area 52 can be adjusted by means of an adjustable shutter 54. The shutter 54 can however be of a fixed type, i.e. one permanent size of the aperture in the shutter, or it can be of an adjustable type, i.e. the size of the aperture can be adjusted either manually or electrically. By using an adjustable shutter 54 the size of the predetermined area at a predetermined distance, e.g. 20 meters from the lens 43 can be adjusted. The detector 50 is communicating with the ECU via communication wire 51 or optionally directly to the light source 20.

As is shown in FIG. 2, the sensor arrangement 40 receives and detects light from a predetermined area at a predetermined distance. The predetermined distance is in FIG. 2 referred to as the target distance. A target area 60, in this case a wall having a brown color, is positioned at a distance of 20 m from the lens 43 of the sensor arrangement 40 and the aiming device 10. The lens 43 collects substantially all light from the ambient environment in front of the aiming device 10, however, due to the distance between the lens 43 and the detector 50 is arranged at a distance b, which can be in the order of 2-25 mm, preferably in the order of 5-20 mm, most preferred in the range of 10-16 mm, the only detected light will be that of the target area, which in this case is the predetermined area 60 at a distance of 20 m (the target distance) from the lens 43.

The focal point of the lens 43 is arranged between the detector 50 and the convex surface 44 of the lens 43, at a distance f from the lens 43. The distance f from the lens 43 to the focal point is indicated in FIG. 2. As mentioned, the only detected light by the detector 50 is the reflected light from a predetermined area at a predetermined distance from the lens 43. In FIG. 2, this is illustrated by light reflected from the target area as two cones formed between the extremes A and B of the predetermined area, i.e. the target area 60. The light reflected from each point A and B, is collected by the lens 43 and diverged to an image plane 60' of the target area 60 delimited by the shutter 54 and collected by the effective detector area by the detector 50. The image distance from the lens is referred to as b in FIG. 2. To control the size of the predetermined area, i.e. the target area 60, the aperture of the shutter 54 should be positioned in the image plane 60'. The light can thereafter be collected by the detector 50 which is positioned in close proximity to the shutter 54 as indicated in FIG. 2.

As can be gleaned from FIG. 2, the light is measured within a void, the void being a three dimensional space void formed between extremes of the collected light, illustrated with the lines between the points A-A' and B-B', and the diameter $D_T$ in FIG. 2.

By either positioning the detector 50 at a specified distance b (the image distance) from the lens 43, or by having a shutter 54, i.e. an aperture at the distance b, the detector 50 only detects light from a predetermined area, in FIG. 3 referred to as the target area 60, at a predetermined distance from the lens 43. The target area 60, as shown in FIG. 2, comprises a circular cross section having a diameter $D_T$, which corresponds to about 2.5 meters at a distance of 20 meters from the lens 43.

In an advantageous embodiment, the reticle reflected by the partly transparent mirror 15, described above with reference to FIG. 1, can be adapted to correspond to a predetermined area at a predetermined distance from the lens 43 of the light sensor arrangement 40 of the aiming device 10. In an advantageous embodiment, the projected light which is reflected on the partly transparent mirror 15 or lens forms a reticle. The reticle covers a predetermined area at the target distance. The area covered by the reticle and the target area 60 can be about 1:2. The diameter $D_T$ of the target area 60 can be twice the diameter $D_S$ of the predetermined area cover by the reticle, at a distance of 20 meters from the lens 43 of the light sensor arrangement 40. In an embodiment the ratio of the area is about 1:1.5 to 1:8, preferably 1:2 to 1:5. This enables a sufficient amount of light to be detected at the target scene or at the target to smoothly adjust the light intensity of the reticle and thus provide an improved aiming device.

An example of suitable parameters for a light sensor arrangement will hereafter follow.

| Lens, type and radius | Plano-convex BK7 glass lens. Lens radius of curvature: 5.1 mm on the curved side. The other side is flat. |
|---|---|
| Detector | Semiconductor photo diode |

| | |
|---|---|
| Effective detector area | Detector diameter 2 mm, a circular detector area, area = 3.14 mm². |
| distance b from lens (image distance) | 10.4 mm |
| Enabled predetermined area at the target distance of 20 meters | Diameter 4.2 m, area = 13.9 m² |

The invention claimed is:

1. An optical aiming device comprising;
a base part comprising means for attaching said aiming device to an object;
a mirror;
a light source, said light source being arranged to project light on said mirror, wherein said mirror is arranged to reflect or redirect at least parts of said light in a first direction, said projected light forming a reticle having a first light intensity;
an ambient light sensor arrangement, said ambient light sensor arrangement being arranged to cooperate with said light source to enable adjustment of the light intensity of said reticle to a second light intensity as a function of a sensed parameter of said light sensor arrangement; wherein
that said light sensor arrangement comprises at least one lens having at least one convex surface and at least one detector comprising an effective detector area, wherein said detector is arranged at a distance from said lens and that said effective detector area of said detector is adapted so as to detect light from a predetermined area at a predetermined distance from said lens, said predetermined area is external to said light sensor arrangement.

2. The optical aiming device according to claim 1, wherein said detector is arranged on a distance of about 2-15 mm from said lens.

3. The optical aiming device according to claim 1, wherein said effective detector area of said detector is adapted so that said predetermined area has a diameter of between 1-5 meters at a distance of 20 meters from said lens.

4. The optical aiming device according to claim 3, wherein said effective area of said detector is about 1-5 mm².

5. The optical aiming device according to claim 3, wherein said reticle is adapted to cover a predetermined area of about 20-60% of said predetermined area at a distance of 20 meters from said lens.

6. The optical aiming device according to claim 4, wherein said area covered by said reticle exhibits at least one diameter and in that said diameter of said reticle is adapted to be about 20-60% of said diameter $D_T$ of said predetermined area at a distance of 20 meters from said lens.

7. The optical aiming device according to claim 1, wherein said lens is a biconvex lens or a plano-convex lens.

8. The optical aiming device according claim 7, wherein said plano-convex lens or said biconvex lens comprises one surface having a radius of about 5-10 mm.

9. The optical aiming device according to claim 1, wherein said aiming device comprises an electronic control unit (ECU) and in that said light sensor arrangement communicates with said electronic control unit (ECU) to operate said light intensity of said reticle as a function of said detected parameter.

10. The optical aiming device according to claim 1, wherein said light sensor arrangement further comprises a shutter effectuating the effective detector area of said detector.

11. The optical aiming device according to claim 10, wherein said shutter is an adjustable shutter adapted to adjust said effective detector area of said detector.

* * * * *